(12) United States Patent
Panesar et al.

(10) Patent No.: US 8,347,063 B2
(45) Date of Patent: Jan. 1, 2013

(54) METHOD AND SYSTEM FOR DEVICE ADDRESS TRANSLATION FOR VIRTUALIZATION

(75) Inventors: Kiran Panesar, Hillsboro, OR (US); Philip Lantz, Cornelius, OR (US)

(73) Assignee: Intel Corporation, Santa Clara, CA (US)

( * ) Notice: Subject to any disclaimer, the term of this patent is extended or adjusted under 35 U.S.C. 154(b) by 414 days.

(21) Appl. No.: 11/207,545

(22) Filed: Aug. 19, 2005

(65) Prior Publication Data
US 2007/0043928 A1 Feb. 22, 2007

(51) Int. Cl.
*G06F 12/08* (2006.01)

(52) U.S. Cl. ........ 711/203; 711/202; 711/205; 711/206; 710/3; 718/1; 719/321; 719/324

(58) Field of Classification Search .................. 711/202, 711/203, 205, 206; 710/3; 718/1; 719/321, 719/324
See application file for complete search history.

(56) References Cited

U.S. PATENT DOCUMENTS

| | | | | |
|---|---|---|---|---|
| 4,885,681 | A | * | 12/1989 | Umeno et al. .................. 718/1 |
| 5,129,071 | A | * | 7/1992 | Yamagata et al. ............ 718/100 |
| 5,996,026 | A | * | 11/1999 | Onodera et al. ................... 710/3 |
| 6,681,267 | B2 | * | 1/2004 | Ohmura et al. ................... 710/8 |
| 6,725,289 | B1 | * | 4/2004 | Waldspurger et al. ............ 710/9 |
| 7,082,598 | B1 | * | 7/2006 | Le et al. ......................... 717/127 |
| 7,653,794 | B2 | * | 1/2010 | Michael et al. ............... 711/162 |
| 2002/0169938 | A1 | * | 11/2002 | Scott et al. ..................... 711/207 |
| 2003/0065839 | A1 | * | 4/2003 | Howard et al. ............... 710/100 |
| 2004/0250021 | A1 | * | 12/2004 | Honda et al. .................. 711/114 |
| 2006/0107269 | A1 | * | 5/2006 | Bantz et al. ................... 719/310 |
| 2006/0143311 | A1 | * | 6/2006 | Madukkarumukumana et al. ................................ 710/1 |

OTHER PUBLICATIONS

IEEE 100: The Authoritative Dictionary of IEEE Standards Terms, Dec. 2000, IEEE Press, Seventh Edition, pp. 17 and 787-788.*
U.S. Appl. No. 11/207,544, filed Aug. 19, 2005, Panesar, et al.
U.S. Appl. No. 11/207,495, filed Aug. 19, 2005, Panesar, et al.

* cited by examiner

*Primary Examiner* — Arpan P. Savla
(74) *Attorney, Agent, or Firm* — Caven & Aghevli LLC

(57) ABSTRACT

A method of improving USB device virtualization is proposed that allows giving virtual machines (VMs) direct access to USB devices with a combination hardware and software solutions. The USB host controller replaces device identifiers assigned by the VM with real device identifiers that are unique in the system. The real device identifiers are assigned by the virtual machine monitor (VMM) or the host controller.

36 Claims, 4 Drawing Sheets

| Real USB Device ID | VMID | USB VM Device ID |
|---|---|---|
| 1 | 1 | 1 |
| 2 | 1 | 2 |
| 3 | 2 | 1 |

FIG. 4

METHOD AND SYSTEM FOR DEVICE ADDRESS TRANSLATION FOR VIRTUALIZATION

BACKGROUND OF THE INVENTION

1. Field of the Invention

The present invention relates to virtualization, specifically, assigning and remapping device identifiers for Universal Serial Bus (USB) devices for virtualization.

2. Description of the Related Art

Virtualization is a technique in which a computer system is partitioned into multiple isolated virtual machines (VMs), each of which appears to the software within it to be a complete computer system. The software running within each VM—including the operating system in the VM—may be unaware of any of the other VMs, or even that the computer system is partitioned. The virtual machine monitor (VMM) is responsible for providing the environment in which each VM runs and maintaining isolation between the VMs. FIG. 1 shows an example of a typical virtualized computer system.

Each virtual machine has access to a set of devices, which may be virtual devices or physical devices. These devices include controllers for secondary busses. The VMM controls which physical devices/controllers are assigned to each VM, and also implements the virtual devices that are visible to VMs. If a physical device is exclusively assigned to a single virtual machine, it is not available to the other virtual machines. In current practice, if a device needs to be shared by more than one VM, the VMM typically implements (in software) a virtual device for each VM, and arbitrates access of the virtual devices to the physical device. The implementation of the virtual devices and the arbitration of access to the physical device adds overhead and reduces the performance of both the computer system and the device. Also, the virtual device typically defines a different more limited interface and functionality than the physical device.

USB 2.0 (Universal Serial Bus Revision 2.0 Specification, published 2002) is an external bus that supports data rates of up to 480 Mbps. USB 2.0 is an extension of USB 1.1 (Universal Serial Bus Revision 1.1 Specification, published 1996) and is fully compatible with USB 1.1. Current virtualization software solutions provide limited support for USB 2.0. For example, existing virtualization software solutions do not support isochronous devices nor do they support more than two devices on USB 2.0 per VM.

In the case of a bus handling communication with multiple devices, such as USB, the VMM may wish to assign individual devices on the bus to specific VMs, to avoid the problems associated with virtualizing the devices. However, the bus controller hardware (in the case of USB, the host controller) is used to communicate with all devices on the bus, so it cannot be assigned to any single VM. The bus controller must be virtualized or enhanced in a way that allows each VM to use it to communicate with the devices on the bus that are assigned to that VM.

This invention addresses one of the problems that arises in assigning individual USB devices to specific VMs, which is that the device ID assigned to each USB device must be unique in the system, even though the different operating system software in the various VMs have no way to coordinate what device ID they assign to each device.

BRIEF DESCRIPTION OF THE SEVERAL VIEWS OF THE DRAWINGS

Subject matter is particularly pointed out and distinctly claimed in the concluding portion of the specification. The claimed subject matter, however, both as to organization and method of operation, together with objects, features, and advantages thereof, may best be understood by reference to the following detailed description when read with the accompanying drawings in which:

FIG. 4 is a translation table as utilized by one embodiment of the claimed subject matter.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention.

CROSS-REFERENCE TO RELATED APPLICATIONS

The current application may utilize embodiments depicted in related applications U.S. patent application Ser. Nos. 11/207,495 and 11/207,544, filed on the same date, entitled "A Method And System For Replicating Schedules For Virtualization" with inventors: Kiran Panesar, Philip Lantz, and Rajesh Madukkarumukumana and entitled "Method and System for USB Bandwidth Reservation" with inventors: Kiran Panesar, Philip Lantz, Michael Goldsmith, and Sanjay Kumar, respectively. Another related application, U.S. patent application Ser. No. 11/207,288 is titled "Method and Apparatus for Supporting Universal Serial Bus Devices in a Virtualized Environment" with inventors Kiran Panesar, Sanjay Kumar, Abdul R Ismail and Philip Lantz, which describes software techniques for assigning USB devices to VMs.

The method described in this invention solves the problem of device ID assignment by remapping device identifiers (device IDs) in hardware to allow virtual machines (VMs) direct access to the devices on the bus without software intervention. For example, in one embodiment, the bus controller maintains an explicit translation table that maps VM device IDs to real device IDs. In a second embodiment, the bus controller uses some of the bits in the address field for virtual machine identifier (VMID). In this embodiment, an explicit translation table is not needed. Hence the second embodiment statically partitions the USB device ID space among VMs.

Figure 2:
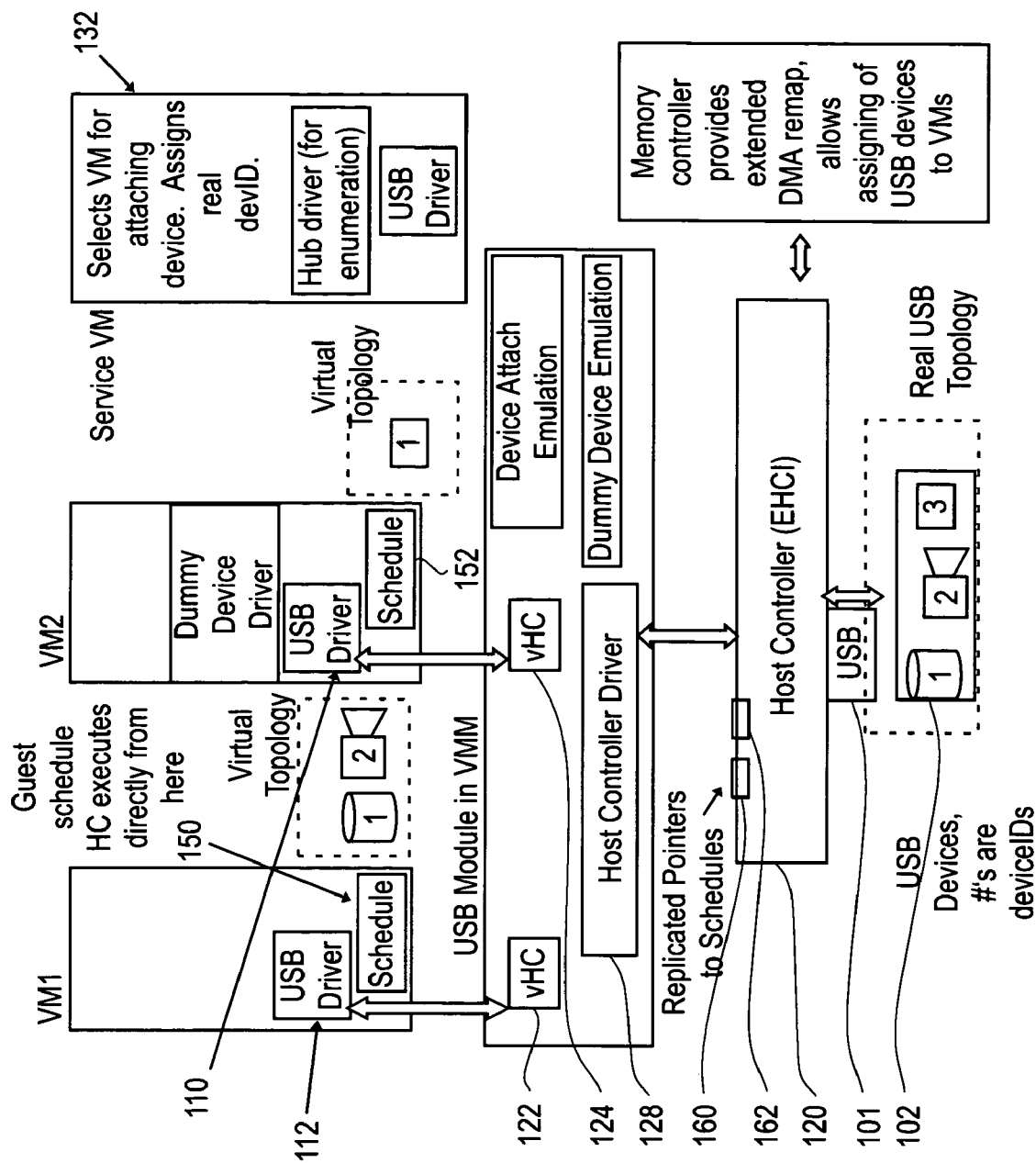
FIG. 2 is a virtualized computer system as utilized by one embodiment of the claimed subject matter.

FIG. 2 is a virtualized computer system as utilized by one embodiment of the claimed subject matter. In this embodiment, the USB driver (110, 112, etc) in each virtual machine communicates with its respective virtual Host Controller (vHC) (122, 124, etc) in the USB module in the VMM. When a USB device is attached to the system, the service VM (132) selects the virtual machine the device should be assigned to and assigns a real device ID. The shaded box (150, 152) in each VM represents the USB schedule created by that VM. The host controller executes directly from that location. The shaded boxes (160, 162) in the Host Controller (120) indicates where the replicated pointers to the schedules reside.

In this figure, three USB devices, 1, 2, and 3 in box 102 are attached to an USB bus 101. Their real device identifiers are 1, 2, and 3, respectively. The USB devices may be storage devices, modems, printers, etc. Practice of the invention is not limited to three USB devices and two virtual machines, but may be generalized to any number of virtual machines and any number of USB devices of various types.

FIG. 4 is a translation table as utilized by one embodiment of the claimed subject matter.

As previously discussed in connection with FIG. 2, three USB devices, 1, 2, and 3 in box 102 are attached to an USB bus 101. Their real device identifiers are 1, 2, and 3, respectively (as depicted in column 104). This table allows the guest operating systems that are running in the virtual machines (VMs) to see a different picture of the USB bus 101. In FIG. 2, USB devices 1 and 2 are assigned to a first virtual machine 1 (VM1). Consequently, VM1's USB driver 112 has assigned them identifiers 1 and 2 (depicted in the first two rows of column 106) with a VMID of 1 for virtual machine 1 (first two rows of column 105). USB device 3 is assigned to a second virtual machine VM2. Consequently, VM2's USB driver 110 has assigned USB device 3 an identifier 1 (depicted in last row of column 106) with a VMID of 2 for virtual machine 2 (last row of column 105). Therefore, VM1 sees two devices with USB device identifiers of 1 and 2; VM2 sees one USB device with an identifier of 1 (reading downward in column 106).

In this embodiment, the host controller utilizes the information in FIG. 4 as follows. The device ID is in the ADDR field of each packet that the host controller transmits. The software in the VM uses the VM device ID, which is unique only within that VM. The USB host controller 120 modifies the ADDR field of each packet by looking up the VMID and the VM device ID in columns 105 and 106 of FIG. 4 and replacing the VM device ID in the packet with the real device ID from column 104.

In one embodiment, FIG. 4 is populated by the VMM. When a device is first attached to the system, the host controller driver 128 in the VMM detects device attachment. The VMM then attaches the device to a service VM by causing an attach event on the virtual host controller attached to the service VM 132. The service VM reads the USB descriptors to determine the type and capabilities of the newly attached device. Subsequently, the service VM then selects a VM. The decision on the selection of the VM could be done utilizing one of many methods: it could be driven from a static configuration file that maps devices to VMs; the service VM could query the user to select a VM; or the service VM could attach the device to the VM that is in user's focus. Other policies for making this decision are possible as well.

The device is then attached to the selected VM's virtual host controller interface. The VM's driver then reads the USB descriptors, and assigns a USB device address. The VMM monitors control transfers from the VM to the device. When the VM issues the set_address command, the VMM replaces the device ID assigned by the software in the VM with the real device ID and records the translation in FIG. 4 by creating a new row in FIG. 4 containing the real device ID, the VMID, and the VM device ID.

In another embodiment, FIG. 4 is populated by the host controller instead of the VMM. The host controller monitors control transfers from the VM. When the VM issues the set_address command, the host controller replaces the VM device ID assigned by the software in the VM with the real device ID and records the translation in FIG. 4.

Device address translation happens as follows:
1) During set_address command, the VMM or the host controller replaces the VM device ID with the real device ID, and populates FIG. 4.
2) During data transfer, the host controller looks up the VM device ID in the transfer descriptor and VMID in columns 105 and 106 of FIG. 4. The host controller replaces the VM device ID with the real device ID from column 104 of FIG. 4 in the data transfer.
3) In split transactions, host controller looks up the VMID and the VM device ID of the hub in FIG. 4 and uses the real device ID of the hub from column 104 of FIG. 4.

Figure 3:
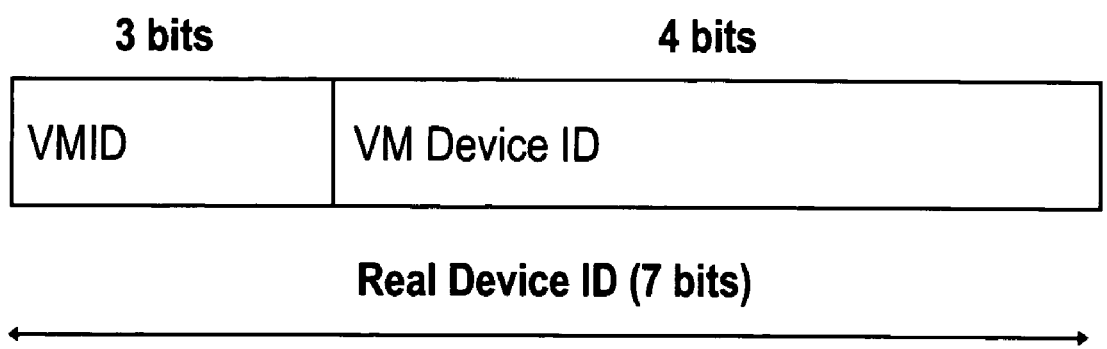
FIG. 3 is an example of generating a device identifier as utilized by one embodiment of the claimed subject matter.

FIG. 3 is an example of generating a device identifier as utilized by an alternative embodiment of the claimed subject matter. In this embodiment, instead of a device ID translation table (FIG. 4), n bits are used to represent VMID from a seven bit address field. Consequently, this supports $2^n$ VMs and each VM can have a max of $2^{(7-n)}$ devices. The VMM guarantees that these limits are adhered to. In this embodiment, and in FIG. 3, n=3 is represented. However, the claimed subject matter is not limited to three since one skilled in the art appreciates utilizing a different number of bits.

The host controller concatenates the VMID bits into the address field, wherever they occur. The address translation happens in the following places:
1) the address field in all data and control packets;
2) the address in the set_address command; and
3) the hub address in split transaction.

Figure 1:
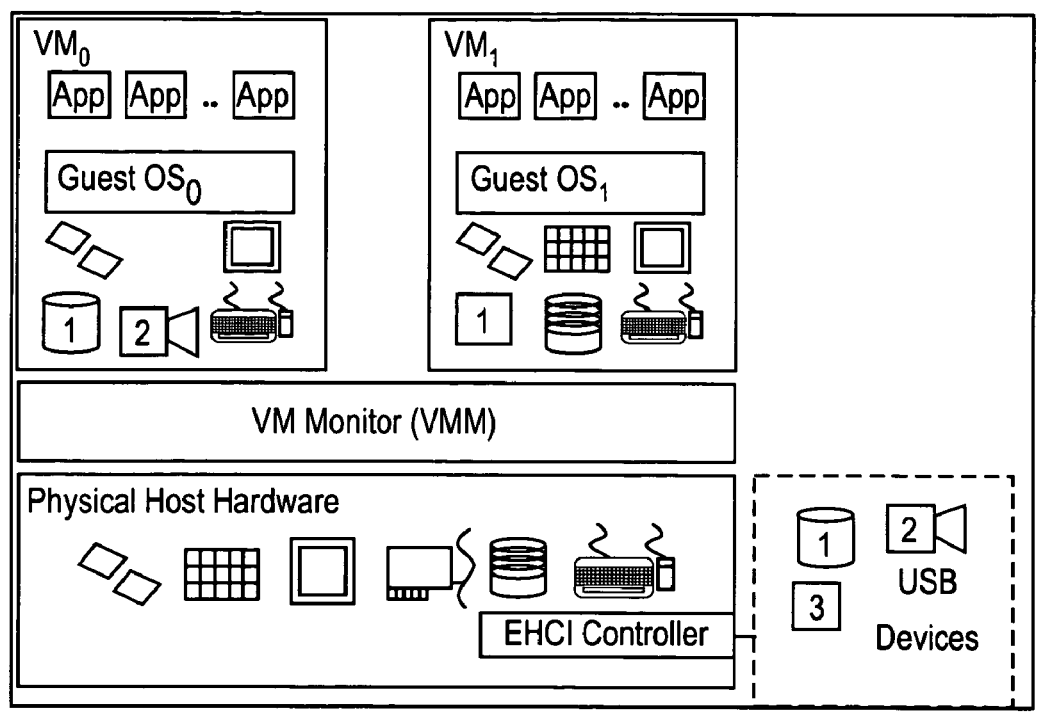
FIG. 1 is a typical virtualized computer system.

For the preceding embodiments depicted in the previous Figures, the claimed subject matter also facilitates USB virtualization for USB hubs. A USB hub is depicted in FIG. 11-1 of the USB specification. USB devices may be attached to hubs. In that case, a few more steps are required for attaching a device to a VM. However, after a device is attached and configured, the address translation mechanisms mentioned earlier apply without any changes.

When a USB device is attached to a hub, the hub driver is first notified. (In contrast, the EHCI driver is notified if a device is attached to a root port.) This hub driver will execute in the VMM or in the service VM. The hub driver then queries the device for descriptors and decides which VM to attach to.

In addition, for one embodiment, a hub module in the VMM provides a virtual hub to each VM. The device is then attached to the virtual hub in the selected VM. The advantage of providing a virtual hub is that slow speed devices can also be supported, and the split transaction scheduling is done by the VM.

After the device is visible to the VM, the device ID address translation mechanisms work as discussed above, even though the USB device is attached to a hub.

Also, the claimed subject matter depicted in the previous Figures and Tables may be implemented in software. These possibilities for software are the VMM, or even the USB device driver (110, 112) in the VMs. For example, the software may be stored in an electronically-accessible medium that includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; and/or flash memory devices.

Although the claimed subject matter has been described with reference to specific embodiments, this description is not meant to be construed in a limiting sense. Various modifications of the disclosed embodiment, as well as alternative embodiments of the claimed subject matter, will become apparent to persons skilled in the art upon reference to the description of the claimed subject matter. It is contemplated, therefore, that such modifications can be made without departing from the spirit or scope of the claimed subject matter as defined in the appended claims.

What is claimed is:

1. A bus controller for a system with a plurality of virtual machines that facilitates device address translation for virtualization of a device by:
modifying an identifier of a virtualized device in all packets, corresponding to the virtualized device, that the bus controller transmits, wherein:
the modifying is performed based on one or more bits of an address field for the identifier of the virtualized device; and
replacing a virtual machine device identifier with a real device identifier in a packet based on the one or more bits of the address field, wherein the virtualized device is to be visible to a virtual machine even when the virtualized device is attached to a hub, wherein the bus controller is to statically partition a USB device identifier space, corresponding to one or more virtualized devices including the virtualized device, among the plurality of virtual machines.

2. The bus controller of claim 1 wherein the replacement of the virtual machine device identifier is in a transfer descriptor.

3. The bus controller of claim 1 wherein the device is a USB device.

4. The bus controller of claim 1 wherein the device is a USB hub.

5. A computer system comprising:
one or more processors;
a memory;
a bus;
one or more virtual machines with one or more virtualized devices; and
a bus controller which modifies an address of a virtualized device in all packets, corresponding to the virtualized device, that the bus controller transmits by replacing a virtual machine device identifier with a real device identifier in a packet, wherein:
the modifying is performed based on one or more bits of an address field for the identifier of the virtualized device; and
the replacing of the virtual machine device identifier with the real device identifier in the packet is performed based on the one or more bits of the address field, wherein the virtualized device is to be visible to a virtual machine even when the virtualized device is attached to a hub, and wherein the bus controller is to statically partition a USB device identifier space, corresponding to one or more virtualized devices including the virtualized device, among the plurality of virtual machines.

6. The system of claim 5 wherein the replacement of the virtual machine device identifier is in a transfer descriptor.

7. The system of claim 5 wherein the device is a USB device.

8. The system of claim 5 wherein the device is a USB hub.

9. A method for device address translation for virtualization of a device comprising:
replacing a virtual machine (VM) device identifier (ID), in all packets, corresponding to the virtualized device, transmitted by a bus controller, with a real device ID in response to:
a predetermined command; and
one or more bits of an address field for the identifier of the virtualized device;
replacing the VM device ID with the real device ID based on the one or more bits of the address field, wherein the virtualized device is to be visible to a virtual machine even when the virtualized device is attached to a hub, wherein the bus controller is to statically partition a USB device identifier space, corresponding to one or more virtualized devices including the virtualized device, among the plurality of virtual machines.

10. The method of claim 9 wherein the predetermined command is a set address command.

11. The method of claim 9 wherein a virtual machine monitor (VMM) or a host controller performs the replacement of the VM device ID.

12. The method of claim 9 wherein a host controller looks up the VMID and the VM device ID of a hub in the translation table and uses the real device ID of the hub from the translation table for split transactions.

13. The bus controller of claim 1 wherein the virtual machine identifier and the virtual machine device identifier are combined to form the corresponding real device identifier.

14. The system of claim 5 wherein the virtual machine identifier and the virtual machine device identifier are combined to form the corresponding real device identifier.

15. The method of claim 9 further comprising combining the virtual machine identifier and the virtual machine device identifier to form the corresponding real device identifier.

16. The bus controller of claim 1 further comprising the bus controller populating the table in response to attachment of the device.

17. The bus controller of claim 1 further comprising a VMM software populating the table in response to attachment of the device.

18. The system of claim 5 wherein the bus controller is to populate the table in response to attachment of the device to the system.

19. The system of claim 5 wherein a VMM software is to populate the table in response to attachment of the device to the system.

20. A non-transitory machine-accessible medium comprising a plurality of machine readable instructions, wherein when the instructions are executed by a system with a plurality of virtual machines, the instructions provide for address translation for virtualization of a device:
in response to attaching the device to the system, reading the capabilities of the attached device;
selecting one of the virtual machines to attach to the device based on one or more bits of an address field for an identifier of the virtualized device;
wherein a virtual machine (VM) device identifier (ID), in all packets, corresponding to the virtualized device, transmitted by a bus controller, is to be replaced with a real device ID based on the one or more bits of the address field, wherein the virtualized device is to be visible to a virtual machine even when the virtualized device is attached to a hub, wherein the bus controller is to statically partition a USB device identifier space, corresponding to one or more virtualized devices including the virtualized device, among the plurality of virtual machines.

21. The non-transitory medium of claim 20 wherein the device is a USB device.

22. The non-transitory medium of claim 20 wherein reading the capabilities of the attached device are done by reading USB descriptors of the device.

23. The non-transitory medium of claim 20 wherein a virtual machine device identifier of a received packet is replaced with a real device identifier in the packet based on corresponding identifiers stored in the table.

24. A non-transitory machine-accessible medium comprising a plurality of machine readable instructions, wherein when the instructions are executed by a system with a plurality of virtual machines, the instructions provide for address translation for virtualization of a device:
- attaching the device to the system;
- reading the capabilities of the attached device;
- selecting one of the virtual machines to attach to the device based on one or more bits of an address field for an identifier of the virtualized device;
- attaching the device to a virtual host controller of the selected virtual machine;
- assigning a device address; and
- substituting a real device identifier for the virtual machine device identifier for a predetermined set address command, wherein:
  - the substituting is performed based on the one or more bits of the address field;
  - wherein a virtual machine (VM) device identifier (ID), in all packets, corresponding to the virtualized device, transmitted by a bus controller, is to be replaced with a real device ID, wherein the virtualized device is to be visible to a virtual machine even when the virtualized device is attached to a hub, wherein the bus controller is to statically partition a USB device identifier space, corresponding to one or more virtualized devices including the virtualized device, among the plurality of virtual machines.

25. The non-transitory medium of claim 24 wherein the device is a USB device.

26. The non-transitory medium of claim 24 wherein capabilities of the attached device are determined by reading USB descriptors of the device.

27. The non-transitory medium of claim 24 wherein the device identifier is a USB device address.

28. A bus controller for a system with a plurality of virtual machines that facilitates device address translation for virtualization of a device by:
- determining a real device identifier for a data transfer by concatenating a virtual machine identifier and a virtual machine device identifier; and
- replacing the virtual machine device identifier, in all packets, corresponding to the virtualized device, that the bus controller transmits, with the real device identifier based on one or more bits of an address field for the identifier of the virtualized device,
- wherein the virtualized device is to be visible to a virtual machine even when the virtualized device is attached to a hub and wherein the bus controller is to statically partition a USB device identifier space, corresponding to one or more virtualized devices including the virtualized device, among the plurality of virtual machines.

29. The bus controller of claim 28 wherein the device is a USB device.

30. The bus controller of claim 1, wherein the virtualized device is to be only visible to a single virtual machine.

31. The bus controller of claim 1, wherein the hub is a USB hub.

32. A device comprising:
- a bus controller to modify an identifier of a virtualized device in all packets, corresponding to the virtualized device, that the bus controller transmits, wherein the modifying is performed based on one or more bits of an address field for the identifier of the virtualized device; and
- the bus controller to replace a virtual machine device identifier with a real device identifier in a packet based on the one or more bits of the address field, wherein the virtualized device is to be visible to a virtual machine even when the virtualized device is attached to a hub and wherein a bus controller is to statically partition a USB device identifier space, corresponding to one or more virtualized devices including the virtualized device, among the plurality of virtual machines.

33. The device of claim 32, wherein the replacement of the virtual machine device identifier is performed in a transfer descriptor.

34. The device of claim 32, wherein the virtualized device is a USB device.

35. The device of claim 32, wherein the virtualized device is a USB hub.

36. The device of claim 32, wherein the bus controller comprises one or more of: the logic circuitry to modify the identifier and the logic circuitry to replace the virtual machine device identifier.

* * * * *